United States Patent [19]

Zulian

[11] Patent Number: 4,928,224

[45] Date of Patent: May 22, 1990

[54] MULTIPROCESSOR SYSTEM FEATURING GLOBAL DATA MULTIPLATION

[75] Inventor: Ferruccio Zulian, Cornaredo, Italy

[73] Assignee: Bull HN Information Systems Italia S.p.A., Caluso, Italy

[21] Appl. No.: 196,651

[22] Filed: May 19, 1988

[30] Foreign Application Priority Data

Nov. 17, 1987 [IT] Italy ................................ 22666 A/87

[51] Int. Cl.$^5$ ............................................. G06F 15/16
[52] U.S. Cl. .................................. 364/200; 364/228.3; 364/229.2
[58] Field of Search ... 364/200 MS File, 900 MS File

[56] References Cited

U.S. PATENT DOCUMENTS

| | | | |
|---|---|---|---|
| 3,753,234 | 8/1973 | Gilbert et al. | 364/200 |
| 3,889,237 | 6/1975 | Alferness et al. | 364/200 |
| 4,466,098 | 8/1984 | Southard | 379/279 |
| 4,713,834 | 12/1987 | Brahm et al. | 379/28 |
| 4,805,106 | 2/1989 | Pfeifer | 364/200 |
| 4,814,982 | 3/1989 | Weir | 364/200 |

*Primary Examiner*—Lawrence E. Anderson
*Attorney, Agent, or Firm*—Faith F. Driscoll; John S. Solakian

[57] ABSTRACT

A multiprocessor computing system includes a plurality of processors which are connected to each other through a system bus. Each processor comprises a processing unit, a local memory and an interface unit, which are interconnected so that the processing unit of any processor has access to both its own local memory and the local memory of any other processor through such interface unit and the system bus for concurrently writing into all of the local memories, information identified by a destination code as a global data.

9 Claims, 3 Drawing Sheets

MULTIPROCESSOR SYSTEM FEATURING GLOBAL DATA MULTIPLATION

BACKGROUND OF THE INVENTION

1. Field of Use

This invention relates to a multiprocessor computing system featuring global data multiplation.

2. Prior Art

A multiprocessor computing system comprises a plurality of independently or semi independently operating intelligent units or processors which are generally interconnected to a communications bus for communication. The system may also include other units which are passive; that is, units operated only under the direction and control of an intelligent unit. An example of a passive unit is a main working memory connected to the communication bus and shared by the intelligent units.

The objective of distributing the system intelligence among a plurality of processors which may be functionally the same or different, such as a central processor or an I/O processor, is to improve the processing throughput of the system by having different processes and tasks concurrently performed by the various units. Several multiprocessor computing systems are known to have architectures which span from loosely coupled architectures. The extreme of these is a set of independent processors which may exchange some information through a bus to tightly coupled architectures, which at the extreme is a set of processors which share a plurality of resources such as memories, registers, input/output units and are conditioned by each other for operation.

Both types of architectures have advantages and trade-offs which may be summarized as follows. Loosely coupled architectures feature high performance of each individual processor but do not provide for ease of real-time load balancing among processors. Tightly coupled architectures feature by contrast, ease of load balancing and distribution among processors but suffer from the bottleneck produced by the sharing of common resources through one or more buses, also a common resource.

An intermediate approach is one having common resources and local resources such as local memories in each processor. The common resources are accessible to all the processors through the system bus and the local resources being accessible to the pertaining processor. Cache memories, may be viewed in this perspective as local memories.

In this arrangement, contention among processors in accessing common resources may be reduced because most of the information on which they must work may be stored and handled by the local resources. However, in order to make the work results available to the other processors, a copy of the work done must be available in the common resources. This again involves some occupation of the system bus for both writing and reading the requested information and processors activity for performing such operations. The trade-off is further increased by the need to assure congruence among information stored in local resources and the copy of information which is stored in the common working memory.

To overcome these trade-offs, it is strictly mandatory that any information of interest to any of the processors always be stored in common resources and not duplicated in the local resources. The only exception to this requirement may be considered for unmodifiable information, such as operating system instructions which do not contain variable parameters and addresses. They are read only information and can be duplicated at will in any of the local memories.

A proposed alternative approach leads to the concept of shared global resources and is exemplified by European patent application published with number which corresponds to U.S. Pat. No. 4,713,834.

In summary, each processor in a multiprocessor system may have its own local resources, namely a local memory which needs not to be accessed through the system bus. However, the same local resources may be viewed as distributed common resources, accessible by any processor in the system through the system bus. Clearly, this architecture provides some advantage free from the above mentioned restrictions. However, in order to provide increased performance, it still requires that most, if not all, of the information required by more than one processor be stored in a common non-local resource which still must be accessed through the system bus. Thus, the bottleneck resulting from the system bus and common memory sharing is still present eve though lessened to some extent.

SUMMARY OF THE INVENTION

The present invention further improves the efficiency of the multiprocessor system architecture, whether tightly or loosely coupled, or featuring common and/or distributed resources by providing a new use for such distributed resources and circuits which enable such new use. The basic concept of the present invention is to have global data, which is modifiable information required by more than one processor. This information is duplicated and stored in a local memory of the processor comprising the system and a hardware-write mechanism which, without need of software intervention, operates each time global data is modified in a local memory. This correspondingly changes the same global data in all other local memories. Thus, global data may be read by each processor accessing its own local memory without resorting to common memory through the system bus. System bus access is only required when global data is modified in a local memory through a write operation. This modification implies the need to reference through the system bus and the other local memories for a corresponding write operation.

Since the number of times modified information is read largely exceeds the number of times the information is modified and rewritten (i.e. an average more than 2 times), there is a considerable performance increase. Moreover, the concept of "global data" is not rigid and may be tailored to achieve even higher performance increases.

For example, "global data" may be defined as shared and modifiable pieces of information which are likely to remain unchanged over a period of time, during which time they are read out by the same or different processors more than a preestablished number of times such as 5 or 10.

These and other advantages and the implementing features of the invention will appear more clearly from the following description and from the related drawings.

DESCRIPTION OF THE PREFERRED EMBODIMENT

Figure 1:
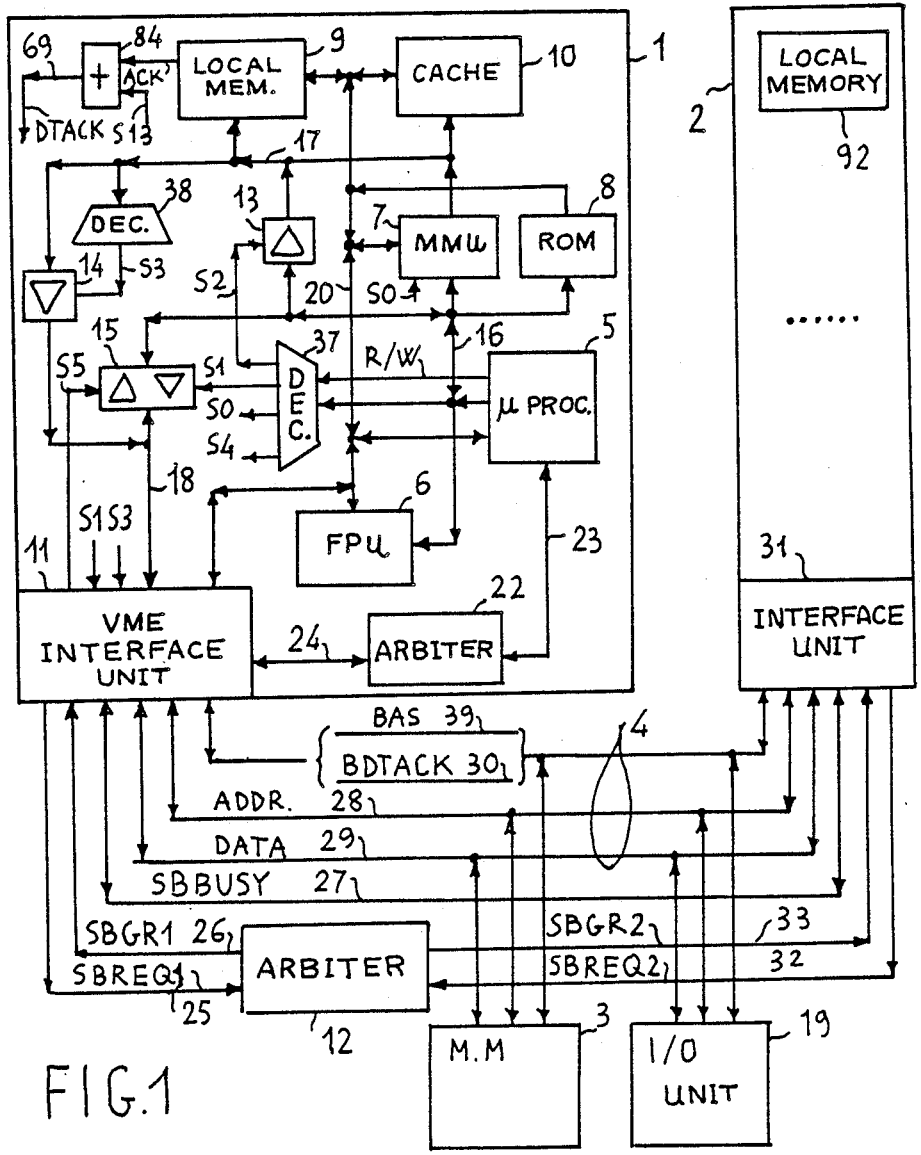
FIG. 1 is a block diagram of a multiprocessor computing system featuring global data multiplation in each of a plurality of local memories according to the invention.

FIG. 1 is a block diagram of a multiprocessor computing system featuring global data multiplation. The preferred embodiment of the system is constructed from well known standard components. In particular, the system comprises two identical processors 1 and 2, a working main memory, MM 3, and an I/O control unit 19.

The two processors, the main memory 3 and the I/O control unit 19 are connected together by a standard VME BUS 4 or system bus. The structure and dialogues performed on the bus 4 are described in detail in the publication titled "VME bus Specification Manual," Rev. B published August 1982 by the VME bus manufacturers group. This document may be referenced for any detailed information not provided herein.

Access to bus 4 is controlled by an arbitration unit 12 or BUS ARBITER. Each processor comprises a microprocessor 5, such as the Motorola MC68020, a floating point unit 6, a memory management unit MMU 7, a read only memory ROM 8 for initialization and bootstrapping, a local memory 9, a cache memory 10 and a VME interface unit 11 for connecting the processor to the VME bus.

A detailed description of the MC68020, the memory management unit 7 and the floating point unit 6 may be found in the following publications: MC68020 - 32 bit Microprocessor, User Manual, Second Edition, Prentice Hall 19841 MC68881 - Floating Point coprocessor, User Manual, First Edition, Motorola 1985; and MC68851 Memory Management Unit, Advance Information, Motorola 1986.

A set of communication leads, collectively referred to as internal bus. connects all these elements. Basically, the internal bus comprises three sections: an address Bus; a data bus; and a control bus. For sake of simplicity, FIG. 1 only shows the address bus and the data bus. The address bus is divided in independent sections, connectable together by means of unidirectional or bidirectional tristate gates 13, 14, and 15. In particular, microprocessor unit 5 has address outputs connected to address bus section 16. MMU 7, ROM 8, gates 13, floating point unit 6 have address inputs connected to address bus section 16. The inputs/outputs of gates 15 are also connected to address bus section 16.

A second address bus section 17 is established between the address outputs of MMU 7, the outputs of gates 13 and the address inputs of local memory 9, the address inputs of cache 10 and the inputs of gates 14.

A third address bus section 18 connects outputs of gates 14, the input/outputs of gates 15 and the input/outputs of VME interface unit 11.

A bidirectional data bus 20 connects together the input/outputs of microprocessor 5, the input/outputs of floating point unit 6, the input/outputs of MMU 7, local memory 9, cache memory 10, VME interface unit 11 and the outputs of ROM 8. An internal bus arbiter 22 controls access to the internal bus. Arbiter 22 is connected to microprocessor 5 through a control bus 23 for the exchange of the following three control signals: signal BREQ from arbiter 22 to microprocessor 5, signal BGRANT from microprocessor 5 to arbiter 22 and signal BGACK from arbiter 22 to microprocessor 5. The internal bus arbiter 22 is also connected to VME interface unit 11 through a control bus 24 for the exchange of the following two control signals: signal MYSP from VME interface unit 11 to arbiter 22, and signal S5 from arbiter 22 to VME interface unit 11.

The VME interface unit is connected to system bus 4 for receiving and transmitting addresses, data signals and control signals for obtaining access to the system bus. Access to the system bus is controlled by a VME BUS ARBITER 12.

When processor 1 needs access to the system bus, the VME interface unit 11 asserts a SBREQ1 signal on lead 25. On receipt of this signal, BUS ARBITER 12 if no higher priority requests are present, asserts signal SBGR1 1 on lead 26. On receipt of this signal, the VME interface unit 11 waits until the system bus is effectively available. This condition is indicated by nonassertion of a signal SBBUSY on lead 27. Unit 11 then asserts signal SBBUSY on lead 27 and gains access to the system bus by placing an address on leads 28, an address strobe signal BAS on a lead of control bus 39 and in the case of data information, on data leads 29 for a write operation. The destination unit which may be processor 2, main memory 3 or I/O control unit 19, as defined by an address portion, takes the data information and asserts a data acknowledge signal BDTACK on a control bus lead 30.

In case of a read operation, the destination unit applies signal BDTACK after having placed the requested information on data leads 29. On receipt of this signal, VME interface unit 11, after having taken the read out information from system bus leads 29, relinquishes control over the bus by negating signal SBBUSY. Clearly, processor 2 may have the same architecture as processor 1, and particularly, a VME interface unit 31 connected to VME BUS ARBITER 12 by leads 32 and 33 instead of leads 25 and 26 to transmit a signal SBREQ2 and to receive a signal SBGR2.

Before considering in more detail, the structure and operation of the VME interface unit 11 or the processors operation in gaining access to distributed storage resources, it is advisable to consider how the system memory space or simply, system space is structured and referenced.

SYSTEM SPACE ADDRESSING

Figure 2:
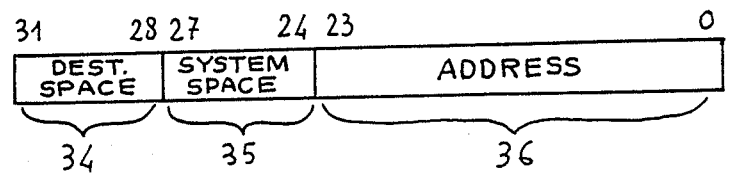
FIG. 2 shows the format structure of a memory address used in,,the system of FIG. 1.

FIG. 2 shows the structure of an address referencing a location in the system space. An address information is composed of 32 bits. A zone 34 of such information comprising, for instance, the most significant bits from 28 to 31 defines a "destination space" with a binary code. For example, a binary destination code 0000 references an internal space. This means that an address generated within processor 1 by microprocessor 5 or MMU 7 where the destination code is 0000 references a storage location which is internal within processor 1.

Thus, with reference to FIG. 1, the referenced location may be in local memory 9, in ROM memory 8 or in any one of the addressable registers, not shown and contained in processor 1. The unit to be referenced within processor 1 is defined by zone 35 of the address. Such zone, comprising bits 24 to 27 of the address defines a system space with a binary code, . For instance, a space code "0000" may reference a "mapped space" and ma indicate that the zone 36 of the address must be translated by the MMU 7 from a logical address into a physical address. A system space code "01XX" (X stands for either 1 or 0) may reference an unmapped physical space and may indicate that zone 36 is a physical address for local memory 9 and must not be translated. Likewise, a space code "0101" may reference a register space, and may indicate that zone 36 or a portion thereof is a code which identifies one of several registers.

Reconsidering, a zone 34 destination code "0001" may reference a destination space located in processor 1. A destination code "0010" may reference a destination space located in processor 2. Thus, if the address containing the destination code "0001" is generated within processor 1, the referenced destination space is still internally within the processor and code "0001" is synonymous to "0000." However, if the destination code "0001" is generated within processor 2, the reference destination space is not internal to processor 2 but pertains to processor 1.

Likewise, if the address containing destination code "0010" is generated by processor 1, the destination space is within processor 2 and if destination code "0010" is generated by processor 2, the destination space is still internal to processor 2 and code "0010" is synonymous to "0000." A further destination code, for instance 0100, may reference a main memory 3 as a destination unit.

Likewise another destination code may reference input/output unit 19 and other codes may reference other units not shown, but connected to the system bus. Obviously, there are some contingent restrictions in the combinations of the various destination codes and system space codes. For instance, main memory 3 is always addressed with physical addresses and therefore destination code "0100" must be coupled with space code "01XX." It must be noted that although main memory 3 may be present in the system architecture, it is not essential to the architecture or to the present invention. If destination code "0100" is coupled with space code "0000," the address is first translated by the MMU of the processor which generated the address (i.e. MMU 7 in case of processor 1) into a physical address where the space code is converted into "01XX."

Likewise, a local memory such as local memory 9, may be referenced by microprocessor 5 both with a physical address and a logical address, the logical address being converted by MMU7 into a physical address. However, local memory 9 may be referenced by another processor such as processor 2, only by means of a physical address.

Peculiar to the present invention is the fact that a destination code, for instance "1110," is assigned the meaning of global data space. This code indicates that the destination unit is not a particular unit, but all the active processors, such as processor 1 and 2 are to be jointly considered as the destination processor. Therefore, an address containing such destination code references storage location in both processor 1 and processor 2. This code is used essentially and exclusively for write operations.

By the use of such code and suitable hardware in the VME interface units such as 11 and 31, it becomes possible to perform a write operation on both a storage location within processor 1 as well as in processor 2 nearly simultaneously and with the execution of the same write instruction. The meaning of the wording "nearly simultaneously" will become clear in the following. It is now possible to consider the processor's operation in gaining access to distributed storage resources.

ACCESS TO DISTRIBUTED STORAGE RESOURCES

With reference to FIG. 1, first consider the case of access to local storage resources by processor 1. Normally, microprocessor 5 has control over the internal bus and can place addresses on the address bus 16 and broadcast or receive data on the data bus 20. When an address is placed on address bus 16, a decoder 37 having inputs connected to address bus 16 decodes the destination code as well as the system space code. If the destination code is "0000" or "0001," decoder 37 outputs suitable selection signals which depend on the space code and selects one of the internal resources.

Specifically, if the system space code references a register space, an S4 signal is produced for selection of register banks, not shown. If the system space code "0000" references a mapped space, decoder 37 outputs a selection signal S0 for MMU 7. MMU 7 converts the received logical address into a physical address which is placed on bus 17, and unless the destination code of such physical address is modified into a destination code other than 0000 or 0001, it activates cache 10 and local memory 9.

If an address match occurs in the cache 10 and the operation to be performed is a read, the requested information is read out from cache 10 and placed on channel 20 for delivery to microprocessor 5. If no address match occurs in the cache 10, the requested information is read out from local memory 9. In case of write operation, the information may be written into both the cache 10 and the local memory 9 (i.e. "write through" cache). If the system space code "01XX" references an unmapped physical space, decoder 37 outputs a selection signal S2 which enables gates 13 to transfer the physical address onto bus 17 and activates cache 10 and local memory 9 which operate as described above.

It may be noted that in performing these operations for all considered cases, the internal bus arbiter 22, the VME interface 11, and gates 14 and 15 are not involved. A different situation arises if processor 1 needs access to external storage resources or if MMU 7 generates a physical address which references by a destination code other than "0000" or "0001," an external storage resource; that is, a resource outside processor 1.

Assume, for instance, that microprocessor 5 places on address bus 16, an address where the destination code is "0010" identifying the storage resource as being owned by processor 2. This code is decoded by decoder 37 resulting in a control signal S1 which enables gates 15 to transfer the address code from bus 16 to bus 18 and at the same time controls the VME interface unit 11 to gain access to the system bus. The VME interface unit 11 issues a SBREQ1 signal to VME BUS ARBITER 12 which in due time responds by asserting signal SBGR1. As soon as the system bus is available, the VME interface unit 11 asserts signal SBBUSY and places the address information on address leads 28.

Through address leads 28, the destination code is broadcasted to all possible destination units such as processor 2, main memory 3 and I/O control unit 19. Each of these units has a VME interface unit including a decoder or a comparator which compares the destination code with a code indicative of its own unit name. If the destination code and the name of the unit match, the unit is selected and uses the address to reference an internal storage location where to read the requested information is read and placed on data leads 29 or where write information has been placed on data leads 29 by the unit which has initiated the transfer, for example, processor 1 through VME interface unit 11, whilst processor 2 is the destination unit.

Assume now that microprocessor 5 places on address bus 16, a logical address with the destination code of "0000" or "0001." This address is converted by MMU7 into a physical address with the destination code of "0010" which is put on bus 17. Decoder 37 does not initiate any action on VME interface unit 11. However, a second decoder 38 having inputs connected to bus 17, detects such code and generates a control signal S3 which enables gates 14 and at the same time, controls VME interface unit 11 to gain access to the system bus. Once access is obtained, the data information transfer is performed as before.

The operation of processor 1 will now be considered assuming it has been designated as the destination unit by an address on the system bus. A comparator or decoder internally within the VME interface unit, detects a match with the destination code "0001" and its own name and generates a MYSP signal to the internal bus arbiter 22. Arbiter 22 transfers such signal as BREQ to microprocessor 5.

When microprocessor 5 is ready to relinquish control over the internal bus, it returns a BGRANT signal to arbiter 22 which upon detecting that the internal bus is effectively available based on the level of certain signals, asserts signal BGACK microprocessor 5 and raises to a "1," a signal S5 to VME interface unit 11. Thereafter, the units connected to the internal bus may be referenced through the address bus and data written into or read from the referenced unit.

Even if conceptually any unit may be referenced, in practice, only the local memory 9, cache 10 and registers, not shown, are referenced. Signal S5 is transferred through the VME interface unit 11 to the enabling input of gates 15 which are enables the transfer of the address present on leads 28 and bus 18 to bus 16. Since an unmapped space is usually designated by space code "01XX," decoder 37 generates signal S2 and the address is transferred from bus 16 to bus 17 through gates 13 for a direct reference to cache unit 10 and local memory 9. If the space code references a register space, the decoder 37 outputs signal S4 for selection of register banks, not shown.

GLOBAL DATA MULTIPLATION

According to the invention, each local memory in each of the active processors such as local memory 9 in processor 1 is intended to store a copy of global data. Every time global data is written or modified in the local memory of processor 1, it is also written or modified in the local memory of processor 2 and that of any other additional processor if there are more than two. Assuming that local memory 9 does not initially contain any global data nor does the local memory in processor 2, the global data will be stored in main memory 3 or in some disk storage unit controlled by I/O control unit 19.

If global data is stored in main memory 3, processor 1 may read such information by addressing main memory 3 with an address where the destination code is "0100" or another suitable code if global data is stored in a disk mass storage unit. Once received, the information may be written by microprocessor 5 into local memory 9 at a preestablished address in which the destination code is set to "1110" and the space code may be set to "0000" (mapped space) or to "01XX" unmapped space. Clearly, if space code is set to "0000," microprocessor 5 will have previously loaded the MMU 7 with suitable information for the conversion of logical addresses into physical addresses.

Decoders 37 and 38 are peculiar to the invention in that they decode destination code "1110" concurrent with a write R/W command issued by microprocessor 5 and a set of control signals which include S1 plus S2 if the space code is "01XX" (unmapped space) or S3 plus S0 if the space code is 0000 (mapped space). Thus, not only the local memory 9 and cache 10 of processor 1 are referenced for storing the global data information, but also the VME interface unit 11 is activated for broadcasting over the system bus, a write instruction to other processors.

The VME interface units 11 and 31 of processors 1 and 2 respectively are peculiar to the invention in that, if not activated by signals S1 and S3, they are able to decode destination code "1110" as referencing the processor to which they pertain. Thus, VME interface unit 31 upon receipt of destination code "1110" identifies processor 2 as destination unit and the address present on the system bus is transferred within processor 2 through VME unit 31 and elements functionally equivalent to bus 18, gates 15, gates 13 to the local (and cache) memory of processor 2 for writing therein, the information which is present on system data bus 29.

Clearly, this multiple write or broadcast write operation is performed not only at initialization but at any time that new information identified as global data is written in any one of the local memories so that the identity of global data contents of all the local memories is assured during system operation. As a consequence, every time a processor needs to read global data information, it can get it from its own local memory or related cache unit without having to resort to system bus data transfers. Obviously, the constraints intrinsic to information shared by multiple processors is still present.

A set of global data currently used by one processor cannot be simultaneously used by other processors which could change it. This can be easily obtained with well-established methods of data partitioning into blocks and the setting of lock bits through well established tests and set operations which prevent concurrent utilization of the same block by more than one processor.

For completeness of description, a preferred implementation of the VME interface unit 11 or 31 will now be described.

VME INTERFACE UNIT

Figure 3:
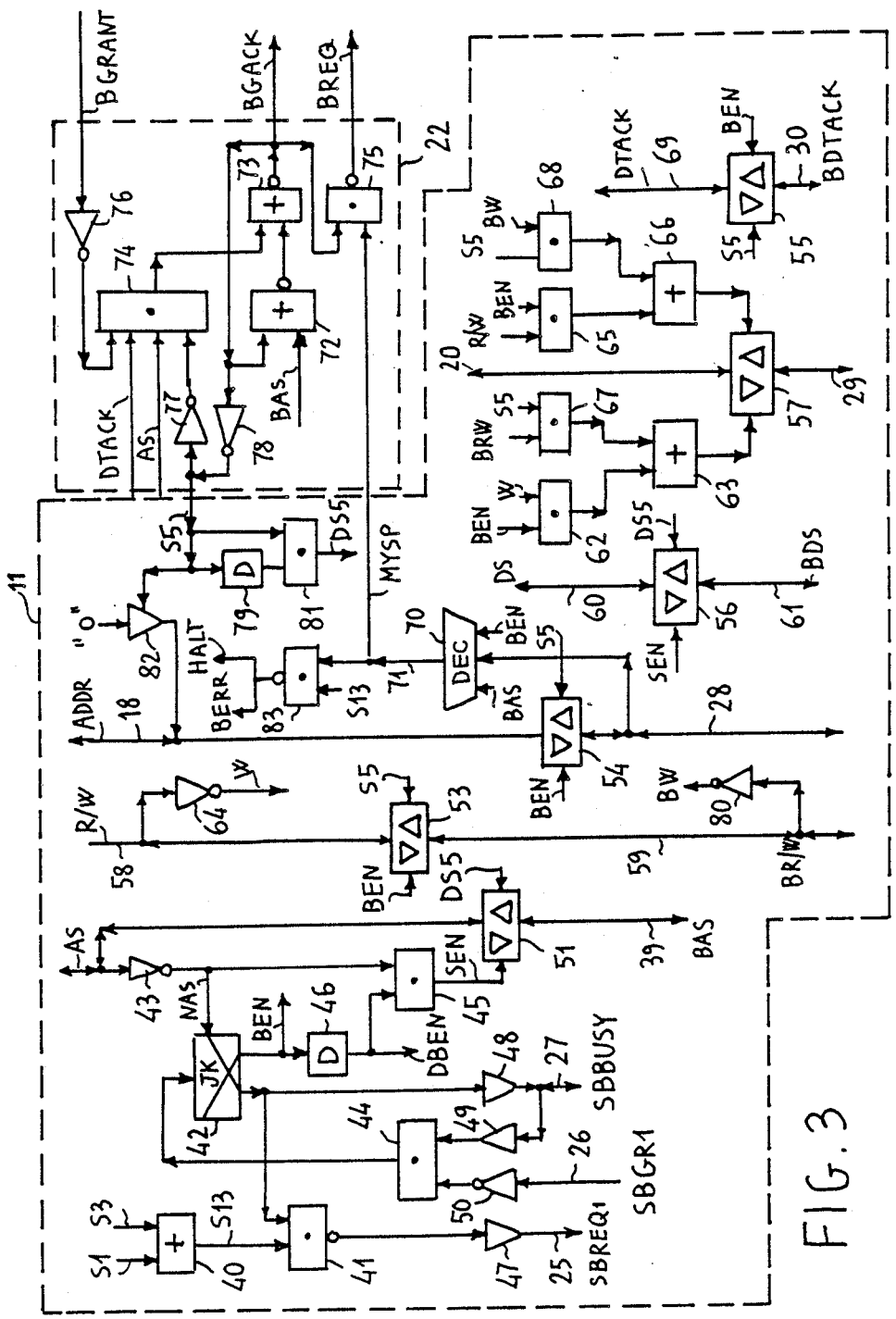
FIG. 3 shows a preferred form of embodiment of an interface unit included in the processors of the system in FIG. 1.

FIG. 3 is a detailed block diagram of a preferred embodiment for the VME interface unit 11. It further shows a preferred embodiment of arbitration unit 22, enclosed in dotted lines. Basically, the VME interface unit comprises interface drivers and receivers, bidirectional tristate drivers and logical gates controlling such drivers. It further comprises logical elements for requesting and getting access to the system bus.

The bus access logic comprises OR gate 40, NAND gate 41, JK flip-flop 42, NOT 43, AND gates 44 and 45, a delay element 46, drivers 47 and 48, receiver 49 and inverting receiver 50. The interconnection among the elements comprising the bus access logic is as shown in FIG. 3 and does not require any detailed description beyond the following explanation of logic operation. Flip-flop 42 is normally in a reset state and held in reset by signal NAS, the negation of signal AS, when at logic 0 level. Signal AS is an address strobe signal which is asserted (i.e. placed at electrical logic 0 level) by microprocessor 5 of FIG. 1 every time it gets access to the internal bus and which is raised to a logic 1 when the internal bus is released.

Thus, microprocessor 5 places an address on the internal address bus 16 and asserts signal AS indicating that a resource external to processor 1 has to be addressed. Signal S1 or S3 is raised to logic 1 level and a signal SBREQ1 is asserted (i.e. placed at logic 0 level) on lead 25. In due time, VME arbiter 12 responds by asserting (placing a logic 0 level) signal SBGR1 on lead 26.

As soon as the system bus is available, SBBUSY signal on bus lead 27 rises to a logic 1 and output of AND gate 44 rises to a logic 1, setting flip-flop 42. With the setting of flip-flop 42, signal SBREQ1 becomes non asserted (i.e. rises to a logic 1) and signal SBBUSY is asserted (i.e. dropped to a logic 0).

Further, at direct output of flip-flop 42, a signal BEN is raised to a logic 1 and with a delay imposed by delay element 46, a signal DBEN is also raised to a logic 1. Signal BEN is used to timely enable drivers and receivers in the VME interface unit 11. Signals DBEN and NAS obtained from inverter 43 are applied as inputs to AND gate 45 which outputs a SEN (Strobe Enable) signal. Signal SEN is specifically used to enable drivers devoted to the transfer of strobe signals. In particular, bidirectional driver 51 is enabled to transfer as an output on a system bus lead 39, a BAS (Bus Address Strobe) signal.

When the external read/write operation has been completed, microprocessor 5 raises signal AS to a logic 1 which has the effect of resetting flip-flop 42 and at the same time, raising signal BAS to a logic 1 and disabling bidirectional driver 51. As a consequence, signal SBBUSY on lead 27 is driven high, and signals BEN, DBEN and SEN are driven low.

In addition to bidirectional driver 51, VME interface unit comprises three bidirectional drivers 53, 54 and 55 and two sets of bidirectional drivers 56 and 57. Bidirectional driver 53 controls the transfer of a R/W signal placed by microprocessor 5 on an internal bus lead 58 from internal bus lead 58 to a system bus lead 59 and the transfer of a signal BR/W placed by processor 2 or any processor other than 1 if more than 2, on system bus lead 59 from lead 59 to internal lead 58. Driver 53 is enabled for an output by signal BEN.

Thus, when signal BEN=1, signal R/W from microprocessor 5 is placed on lead 59 and indicates the requested transfer direction; that is, a write operation from processor 1 to another destination unit when R/W=0 and a read operation from a destination unit to processor 1 when R/W=1. Bidirectional driver set 54 controls the transfer of addresses including destination code and space code between internal address bus 18 and the system address bus 28. Set 54 is enabled to provide an output from processor 1 by signal BEN.

Bidirectional driver 56 controls the transfer of a data strobe signal DS from an internal bus lead 60 to a system bus lead 61 and the transfer of a data strobe signal BDS placed by units other than processor 1 on system bus lead 61 from lead 61 to lead 60. Driver 56 is enabled for an output by signal SEN. Bidirectional driver set 57 controls the transfer of data between internal data bus 20 and system data bus 29.

Since the transfer direction is dependent not only on the unit initiating the transfer but also on the nature (i.e. read/write) of the transfer, very simple logic is used to enable such set. AND gate 62 receives input signal BEN and signal W obtained from R/W through inverter 64, provides an enabling signal to driver set 57 through OR gate 63 for a write operation. AND gate 65 receives input signals BEN and R/W, and provides an enabling signal to driver set 57 through OR gate 66 for a read operation. Thus, AND gates 62 and 65 enable driver set 57 when the unit requesting the transfer is processor 1. AND gates 67 and 68 which enable driver set 57 when the transfer request comes from the system bus will be considered later herein.

Bidirectional driver 55 controls the transfer of a data acknowledge signal DTACK from an internal bus lead 69 to a system bus lead 30 and the transfer of a system bus data acknowledge signal BDTACK from lead 30 to lead 69. Driver 55 is enabled at its input by signal BEN.

The operation of the VME interface unit for system bus access requested by processor 1 will now be explained briefly. Once processor 1 has gained access to the system bus and asserted signal SBBUSY, driver 53 and driver set 54 are enabled for an output and driver 55 is enabled for an input. Driver set 57 is enabled for an input or output depending on level of R/W signal. Thus, if the operation is a write, an address code and a data code are put on the system bus. Immediately thereafter, strobe signals BAS and BDS are asserted through drivers 51 and 56 to validate address and data.

The destination unit identified by the destination code in the address code, responds to the requesting unit by writing the received data or reading the requested data at the location referenced by the address code and asserts signal BDTACK on the system bus. Signal BDTACK either has the meaning of data accepted and stored in case of write request or data available on system bus in case of read request. On receipt of signal BDTACK through driver 55, processor 1 and specifically microprocessor 5 gets the received data in case of read request and frees the system bus by raising signal AS to a logic 1. When this signal BBUSY is raised to a logic 1, all the drivers, including bidirectional driver 55, are disabled.

FIG. 3 may now be considered with reference to another situation in which the VME interface unit 11 instead of requesting system bus access is a destination unit. Thus, some other unit, and specifically processor 2, is using the system bus and with a suitable destination code which may either be "0001" or "1110" references processor 1.

A decoder 70 has inputs connected through permanently enabled receivers, not shown, if required to the leads of address bus 28. It further receives as an input, signal BAS from lead 52 and signal BEN.

When signals BAS and BEN are both low indicating that the address code on bus 28 is meaningful and processor 1 is not using the system bus, decoder 70 is enabled. If the received destination code is "1110" or "0001," a (my space) signal MYSP at a logic 1 level is placed on lead 71.

Signal MYSP is applied as an input to arbitration unit 22. Arbitration unit 22 comprises NOR gates 72 and 73, AND gate 74, NAND gate 75 and inverters 76, 77 and 78 interconnected as shown in FIG. 3. NAND gate 75 receives as inputs, signal MYSP and signal BGACK, an output from NOR gate 73.

Thus, if signal BGACK is high, indicating that the internal bus is under control of microprocessor 5, gate 75 on receipt of signal MYSP outputs signal BREQ at logic 0 level. Signal BREQ is received by microprocessor 5 which when ready to relinquish control over the internal bus, asserts (drops to 0) signal BGRANT. Signal BGRANT is an input to inverter 76 whose output is connected to one input of AND gate 74. AND gate 74 receives at other inputs, signals DTACK, AS and BGACK through cascaded inverters 77 and 78. All these signals logic 1 levels indicate that the internal bus is effectively free.

Thus on receipt of signal BGRANT and as soon as the internal bus is available, the AND 74 output rises to a logic 1 and through NOR gate 73 asserts (drops to 0) signal BGACK. Arbiter 22 gains control over the internal bus and passes such control to VME interface unit 11 in form of enabling signal S5 obtained from signal BGACK through inverter 78. NOR gate 72 which receives as inputs, signal BAS from the system bus and signal BGACK, performs a holding low function on signal BGACK as long as signal BAS is low. Signal S5, as may be seen, is used as enabling signal for enabling the input of driver set 54 and for enabling the output of driver 55. As to driver set 57, it is enabled at the input or output depending on the level of signal BRW on lead 59.

Signals S5 and BRW are applied as inputs to AND gate 67 which through OR gate 63 enables driver set 57 output consistently with a read request originated by an outside processor. Signals S5 and BRW obtained from BRW through inverter 80 are applied as inputs to AND gate 68 which through OR gate 66 enables the input of driver set 57.

A NAND gate 81 receives as inputs, signal S5 and a signal obtained from S5 through a delay element 79, and produces as an output, a delayed enabling signal DS5 which is used for enabling the inputs of driver 51 and driver 56. It is immediately apparent that signals S5 and DS5 perform the same enabling functions of signals BEN and SEN but reverse the direction of transfer.

In conclusion, when a unit other that processor 1 requests access to resources within processor 1, the destination code present on the system bus is decoded, a signal MYSP is generated and as soon as the internal bus is available, arbiter 22 generates signal S5 and the interface gates are properly enabled. Once the read or write operation has been performed, processor 1 and more particularly, the referenced unit such as local memory 9 within processor 1 asserts on internal bus lead 69, signal DTACK.

On receipt of a low signal DTACK through driver 55 and system bus lead 30, the requesting unit raises signal the BAS on system bus lead 39. BAS signal at the input to NOR gate 72 of arbiter 22 unlocks signal BGACK which is driven high while signal S5 is driven low, disabling all the interface gates.

In order to complete the description of FIG. 3, two details have to be mentioned. It may be seen in FIG. 3 that signal S5 is a further input to the enabling input of a set of drivers 82. Such drivers have data inputs connected to a "0" level source and the outputs connected to some of the internal bus 18 leads. The purpose of such arrangement is to force a destination code "0000" (internal space) on address leads, and to prevent decoders 37 and 38 from generating signals S1 and S3. Obviously, this is only a preferred embodiment. An alternative one, among the many possible ones, would be to input signal S5 to both decoders 37 and 38 as a condition which inhibits generation of signals S1 and S3.

Another problem which must be avoided is deadlock. Assume processor 2 has already taken control over the system bus for a transfer involving processor 1 as destination unit but arbiter 22 in processor 1 has not yet obtained from microprocessor 5, the control over the internal bus. It may happen that at the same time microprocessor 5 tries to gain access to the system bus, no bus grant is given by arbiter 12. Both processors would wait indefinitely.

A very simple solution to this problem, among the many possible ones, is shown in FIG. 3 and consists of NAND gate 83. NAND gate 83 receives as inputs signal MYSP and signal S13, the OR of signals S1 and S3. Thus, in a case where processors 1 and 2 compete for access to the system bus, the output of NAND gate 83 drops to 0 and asserts a BERR signal as well as a HALT signal. When these signals are received by microprocessor 5, it stops executing the current instruction and starts a retry. However, before starting a retry, arbitration logic internal to microprocessor 5 detects the BREQ signal pending, and grants access to the internal bus and postpones the retry operation until the internal bus is again free.

GLOBAL DATA WRITE - TIMING CONSIDERATIONS

At this point, it is important to remember that in performing a global data write, more than two units are involved in the process, a requesting unit and at least two receiving units. Considering again FIG. 1, if microprocessor 5 requests a global data write not only is local memory 9 involved as destination unit but also local memory 92 in processor 2. If processor 5 has gained access to the internal bus and has started a global data write operation, local memory 9 is certainly available to receive the address and the write command. It will perform the write operation immediately within its own execution time and thereafter will assert signal DTACK on lead 69. However, access to the system bus and to the internal bus of processor 2 will involve some propagation time and waiting time in addition to the execution time of local memory 92.

As a consequence, local memory 92 will assert signal DTACK on a lead internal to processor 2 and signal BDTACK on lead 30, a certain time after assertion of signal DTACK by local memory 9. Until that time, microprocessor 5 must hold the internal bus and the system bus and must release them by raising signal AS to a logic 1 only after signal BDTACK has been received. Therefore, the assertion of signal DTACK by local memory 9 must be ignored and the operation must be led by signal BDTACK received from the system bus. This can be easily obtained by masking.

FIG. 1 shows that signal ACK, an output from local memory 9, is applied as an input to OR gate 84 which receives at a second input signal S13. Gate 84 has its output connected to lead DTACK 69. It is therefore clear that any time the VME interface unit 11 is activated, and signal S13 is high, the assertion of signal ACK due to the concurrent activation of local memory 11 is prevented from lowering signal DTACK.

Figure 4:
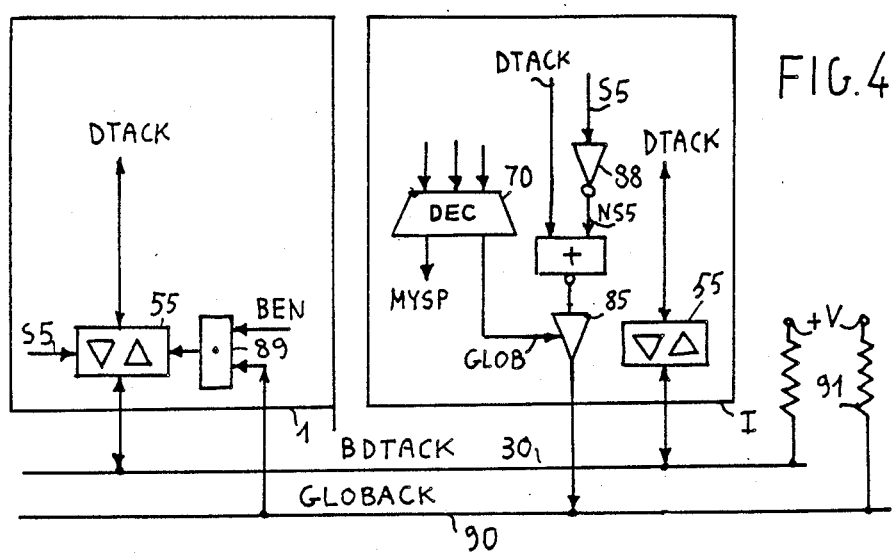
FIG. 4 shows a preferred embodiment of additional circuits included in the interface unit of FIG. 3 used for obtaining an acknowledge signal of a global data write operation performed in all the processors.

In a case where the system comprises more that two processors, it must also be kept in mind that in case of global data write more than one processor asserts, at different times, signal BDTACK on the same bus lead 30. Thus, the first occurring assertion causes signal BDTACK to be lowered to a logic 0 and the later assertion cannot be perceived. An additional bus lead and some additional circuits in the VME interface unit of each of the processors is required to provide an indication that all processors involved in the global data write have asserted their own DTACK signal. FIG. 4 shows a preferred implementation of such circuits and the minor changes required to be made in the circuits of FIG. 3.

In FIG. 4, block 1 represents processor 1 and block I represents a generic processor among N-1 processors with N greater than 2. Processor 1 is considered as requesting processor and processor I is a destination processor. In addition to the circuits shown in FIG. 3, the VME interface unit of processor I comprises a further driver 85, NOR gate 87 and an inverter 88. Such elements are for generating an additional signal GLOBACK.

In addition to the circuits shown in FIG. 3, the VME interface unit of processor 1 comprises an AND gate 89 for receiving signal GLOBACK. It is clear that processor I also comprises a gate equivalent to gate 89 and processor 1 comprises the further elements shown in processor I because the requestor/destination role may be exchanged.

The system bus comprises an additional lead 90 for transferring signal GLOBACK. Lead 90 is connected to a +V voltage source through a pull up resistor 91, not dissimilar from the other bus leads. The output of driver 85 is connected to bus lead 90. The input is connected to output of NOR gate 87. NOR gate 87 receives as inputs, signal DTACK and signal NS5 obtained by passing signal S5 through inverter 88. The enabling input of driver 85 is connected to an output of decoder 70 to receive a GLOB signal that rises to a logic 1 when the destination code "1110" is detected.

AND gate 89 receives as inputs signal BEN and a signal GLOBACK present on lead 90. The output of AND gate 89 is connected to the enabling input of driver receiver 55 and when at logic level 1 enables driver/receiver 55 to receive input signal BDTACK present on lead 30.

Figure 5:
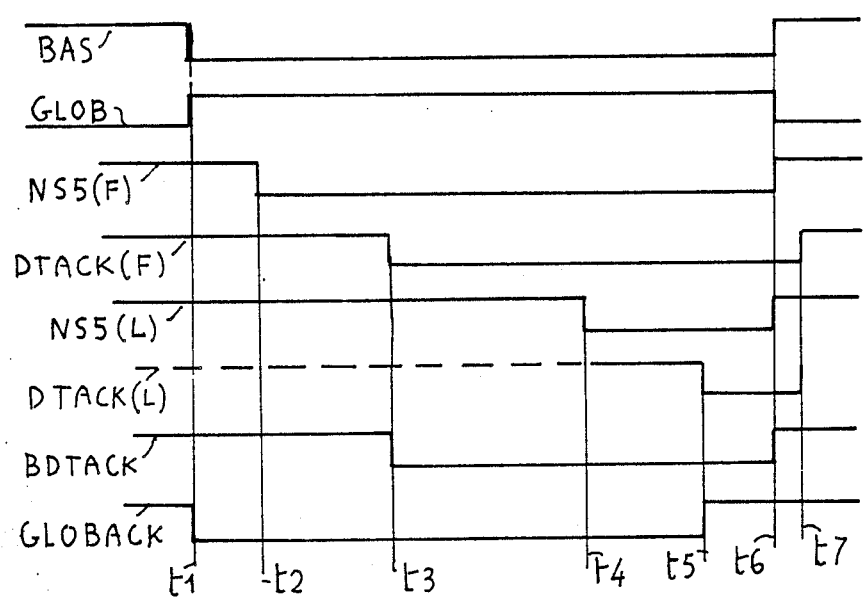
FIG. 5 shows in timing diagram form, the operation of the circuits in FIG. 4.

The operation of such circuits is very simple and can be easily understood with reference to the timing diagram of FIG. 5. Assume processor 1 gains access to the system bus for a global data write operation and at time t1 asserts BAS signal. At the same time in all processors I, decoder 70 detects destination code "1110" and raises to a logic 1, signals MYSP and GLOB. In each processor I, access is requested by the VME interface unit to the internal bus. Before access is granted, signal S5 is at logic 0 level and therefore NS5 is at logic 1 level. Therefore at t1, irrespective of the level of signal DTACK, driver 85 in all processors I outputs a GLOBACK signal at logic 0 level on lead 90.

At time t2, in a first F of the I processors, access to the internal bus is granted. This implies that in such processor, signal DTACK(F) is at a logic 1 level and remains at a logic 1 level until the write operation is completed at time t3. As a consequence the output of driver 85 is held down even if signal NS5(F) is dropped.

At time t3, processor F asserts signal DTACK(F) and consequently signal BDTACK is asserted. It further attempts to raise signal GLOBACK on lead 90 but the other processor still holds signal GLOBACK at a logic 0. As a consequence, driver/receiver 55 is still inhibited and prevents the assertion of signal DTACK in processor 1.

At time t4, in the last L of the I processors, access to the internal bus is granted and S5(L) is raised to a logic 1 and signal NS5(L) is dropped to a logic 0. At time t5, the last L of the I processors completes the write operation and signal DTACK(L) is asserted. The assertion of signal DTACK(L) does not have any effect on signal BDTACK, which is already asserted (i.e. at 0 level). However, it does have effect on signal GLOBACK which is raised to a logic 1. Accordingly, by time t5, receiver 55 is enabled and processor 1 may complete the system bus access by dropping signal BEN and raising BAS signal at time t6. Thus, by time t6, all system bus signals are raised to a logic 1 and shortly thereafter, all DTACK signals are raised to logic 1's at time t7.

It is clear that the above embodiment is only a preferred one and that different arrangements may be envisioned. For instance, the VME interface units in each of the processors may be buffered with an address register and a data register. In this case, once a requesting processor has gained access to the system bus, the address and data registers in each of the destination processors may be simultaneously loaded and thereafter the system bus may be released. The write operation may then be autonomously completed within each destination processor.

Although in the preceding description, reference has been made to microprocessors such as the Motorola 68020 as the core of the processors and to VME bus as the system bus, this has been done only in order to simplify the description of the system structure and operation, but the invention is in no way limited to any particular hardware environment.

What is claimed is:

1. A multiprocessor computing system comprising:
   a plurality of processors connected in common to a system bus, each processor comprising a processing unit, a local memory and an interface unit connected in common to an internal bus, and said interface unit connecting said internal bus to said system bus, said local memory of each processor including a plurality of addressable storage locations for storing information, a number of said storage locations used to store global data currently in use by said plurality of processors, said processing unit of each processor being connected to have access to said local memory of each of the other processors through said system bus and corresponding interface units for reading or writing information referenced by an address code, said address code comprising a destination code for identifying said local memory into which said information is to be read or written, said each processor further including:
   first means including said processing unit for generating a destination code in said address code having a binary configuration for identifying said information as global data in response to each write command generated by said processing unit for storing said information in said local memory associated therewith; and second means including said interface unit responsive to said global data binary configuration in said destination code and to said write command from said first means to concurrently perform a write operation of said information identified as a global data into a specified one of said number of storage locations in said local memory associated therewith and broadcast said address code including said global data binary configuration and said write command on said system bus causing all of said other processors to write said information into one of said number of locations of their local memories so that all of said processors are able to have immediate access to said global data.

2. The multiprocessor system of claim 1 wherein each processor further includes:

means responsive to said global data binary configuration on said system bus for acknowledging the execution of said write operation after all said local memories of said other processors accessed in response to said global data binary configuration on said system bus have performed said write operation in response to said write command.

3. The multiprocessor system of claim 1 wherein said second means of each processor comprises:

a decoder coupled to said system bus, said decoder of each other processor being responsive to said global data binary configuration from said system bus to generate an access request signal to said processor associated therewith for directing said address code referencing said local memory on the system bus to said processor.

4. The multiprocessor system of claim 3 wherein said decoder has a control input connected to receive a signal for inhibiting said decoder from detecting said global data binary configuration on said system bus when said global data binary configuration on said system bus was generated by said each processor.

5. The multiprocessor of claim 4 wherein said second means further comprising means for converting said global data binary configuration received from said system bus into said destination code for referencing said number of locations of local memory of said each processor used for storing said global data.

6. A multiprocessor computing system wherein a plurality of active processors are connected in common to a system bus, each processor comprising a processing unit, a local memory, an interface unit and an internal bus connecting in common said processing unit, said local memory and said interface unit, said interface unit of each processor connecting said internal bus to said system bus, said processing unit having access to the local memory of the same processor through said internal bus for performing read and write operations without having to access said system bus, each said processing unit having access to the local memory of each other processor through said system bus for reading out or storing information from or into any one of said local memories referenced by an address code, and in response to read and write commands generated by said processing unit, said address code comprising a destination code identifying which one of said local memories said information is to be written in or read from, each processor further including:

first means for generating said address code comprising a destination code having a binary configuration which identifies said information as a global data currently in use by said plurality of said processors for both read and write operations;

second means coupled to said first means and responsive to said global data binary configuration in said destination code and said read command generated by said processing unit to select said local memory and perform therein, a read operation at a storage location referenced by said address code without having to access said system bus;

third means coupled to said first means and responsive to said global data binary configuration in said destination code and to said write command generated by said processing unit for concurrently selecting the local memory and said interface unit of said each processor to perform a write operation at a storage location referenced by said address code and broadcasting said address code, including said global data binary configuration, and said write command to said system bus; and, fourth means in said each processor connected to said interface unit and responsive to said global data binary configuration on said system bus by any other processor to detect said write command and perform said requested write operation in the local memory of said each processor.

7. The multiprocessor system of claim 6 wherein each processor further comprises:

fifth means responsive to said global data binary configuration in said destination code and to said write command generated by the same processor, for requesting access to and control over said system bus and for retaining said control over said system bus until a signal is received indicating that said write operation requested by said write command has been performed in the local memories of all other processors.

8. The multiprocessor of claim 6 wherein said fourth means in each processor comprises means for converting said global data binary configuration received from said system bus into a destination code which references the local memory of the same processor.

9. The multiprocessor of claim 6 wherein said fourth means comprises:

a decoder coupled to said system bus responsive to said global data binary configuration from said system to generate an access request signal to said processor associated therewith for directing said address code to said local memory in said processor, said decoder having a control input connected to receive a signal from said processor for inhibiting said decoder from generating said access request signal when said global data binary configuration on said system bus is broadcasted to said system bus by said third means.

* * * * *